(12) United States Patent
Ono

(10) Patent No.: US 10,209,482 B2
(45) Date of Patent: Feb. 19, 2019

(54) LENS CONTROL DEVICE, IMAGING APPARATUS, LENS DEVICE, IMAGING SYSTEM, AND METHOD OF CONTROLLING LENS CONTROL DEVICE

(71) Applicant: CANON KABUSHIKI KAISHA, Tokyo (JP)

(72) Inventor: Yasuhiro Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/695,219

(22) Filed: Sep. 5, 2017

(65) Prior Publication Data

US 2018/0074284 A1 Mar. 15, 2018

(30) Foreign Application Priority Data

Sep. 13, 2016 (JP) ................................ 2016-178538

(51) Int. Cl.
*G02B 7/09* (2006.01)
*G03B 13/36* (2006.01)
*H04N 5/232* (2006.01)
*G03B 5/00* (2006.01)
*G03B 3/10* (2006.01)

(52) U.S. Cl.
CPC ................ *G02B 7/09* (2013.01); *G03B 5/00* (2013.01); *G03B 13/36* (2013.01); *H04N 5/23296* (2013.01); *G03B 3/10* (2013.01); *G03B 2205/0046* (2013.01); *G03B 2205/0053* (2013.01)

(58) Field of Classification Search
CPC .......... G02B 7/102; G02B 7/08; G02B 7/282; H04N 5/23212; G03B 3/10
USPC .......................................................... 359/698
See application file for complete search history.

(56) References Cited

U.S. PATENT DOCUMENTS

2017/0034424 A1* 2/2017 Uemura ............. H04N 5/23212
2017/0242215 A1* 8/2017 Nakamura ................ G02B 7/08

FOREIGN PATENT DOCUMENTS

JP 4108543 B2 6/2008

* cited by examiner

*Primary Examiner* — Mohammed Hasan
(74) *Attorney, Agent, or Firm* — Venable LLP

(57) ABSTRACT

A lens drive control device which drives a lens using a drive unit according to an operation of an operation member is provided that includes a detection unit configured to detect a drive speed of the drive unit; and at least one processor or one circuitry which functions as: a control unit configured to control a drive voltage to the drive unit by acquiring a detection signal of the operation amount of the operation member and a detection signal of the drive speed, wherein the control unit performs first control that a drive voltage output to the drive unit between a time at which the operation of the operation member starts and the time at which the operation ends is changed in a phased manner, and second control that a rise rate of the drive voltage is relatively increased as compared to the first control after the first control.

15 Claims, 7 Drawing Sheets

LENS CONTROL DEVICE, IMAGING APPARATUS, LENS DEVICE, IMAGING SYSTEM, AND METHOD OF CONTROLLING LENS CONTROL DEVICE

BACKGROUND OF THE INVENTION

Field of the Invention

The present invention relates to a drive control such as a zoom lens.

Description of the Related Art

In a compact camera and the like, the weight of a lens barrel tends to increase as magnification increases. If a load increases at the time of an operation of the lens barrel, a zoom operation may be affected. In particular, at a start of the zoom operation, there are effects caused by a posture with respect to the gravity direction of a lens barrel, an operation start position (a difference in a lens-barrel CAM inclination), a load variation in accordance with a lens barrel state due to a temperature change, and the like. If a torque margin of a zoom driving motor is not sufficient with respect to a load variation portion due to a situation at the start of the operation in addition to such a lens-barrel load, the stability of a zoom lens may be lowered.

For the above problems, it is possible to increase motor torque by increasing a current at a start of zoom driving and to improve startability. However, with a reduction of device size in recent years, restrictions on the use of large motors are severe and have contributed to increases in cost. With respect to a current increase at the start of zoom driving, there is a concern about adverse effects in terms of electricity such as a voltage drop and the like accompanied by an increase in current consumption and a steep current increase. Japanese Patent No. 4108543 discloses a technology which can suppress a steep current increase by gradually raising an inrush current during a zoom operation in a phased manner.

However, in a method disclosed in Japanese Patent No. 4108543, it is difficult to improve startability in a zoom micro-operation such as view angle adjustment and a short-time operation. If a drive voltage is gradually increased, the drive voltage increases and a zoom operation ends before the drive voltage reaches a predetermined voltage according to a zoom operation time determined by a user's operation, and thus there may be a hindrance to movement itself. In the case of a short zoom micro-operation, a drop in response may result in a remarkable extension of a driving time. Therefore, there is a possibility that usability when a user performs the zoom operation will be affected.

SUMMARY OF THE INVENTION

According to an embodiment of the present invention, a lens drive control device which drives a lens using a drive unit according to an operation of an operation member is provided that includes a detection unit configured to detect a drive speed of the drive unit; and at least one processor or one circuitry which functions as: a control unit configured to control a drive voltage to the drive unit by acquiring a detection signal of the operation amount of the operation member and a detection signal of the drive speed, wherein the control unit performs first control that a drive voltage output to the drive unit between a time at which the operation of the operation member starts and the time at which the operation ends is changed in a phased manner, and second control that a rise rate of the drive voltage is relatively increased as compared to the first control after the first control.

According to this configuration, it is possible to improve startability at the micro-driving while suppressing an inrush current at the lens driving.

Further features of the present invention will become apparent from the following description of exemplary embodiments (with reference to the attached drawings).

DESCRIPTION OF THE EMBODIMENTS

An imaging apparatus according to embodiments of the present invention is described. Each embodiment will be described in detail after items common to first and second embodiments are described. A drive control device will be described by exemplifying a zoom lens as a movable lens which is moved and controlled in accordance with an operation amount of an operation member in the following embodiments, but the present invention can be applied to various types of drive control devices of movable lenses.

Figure 2:
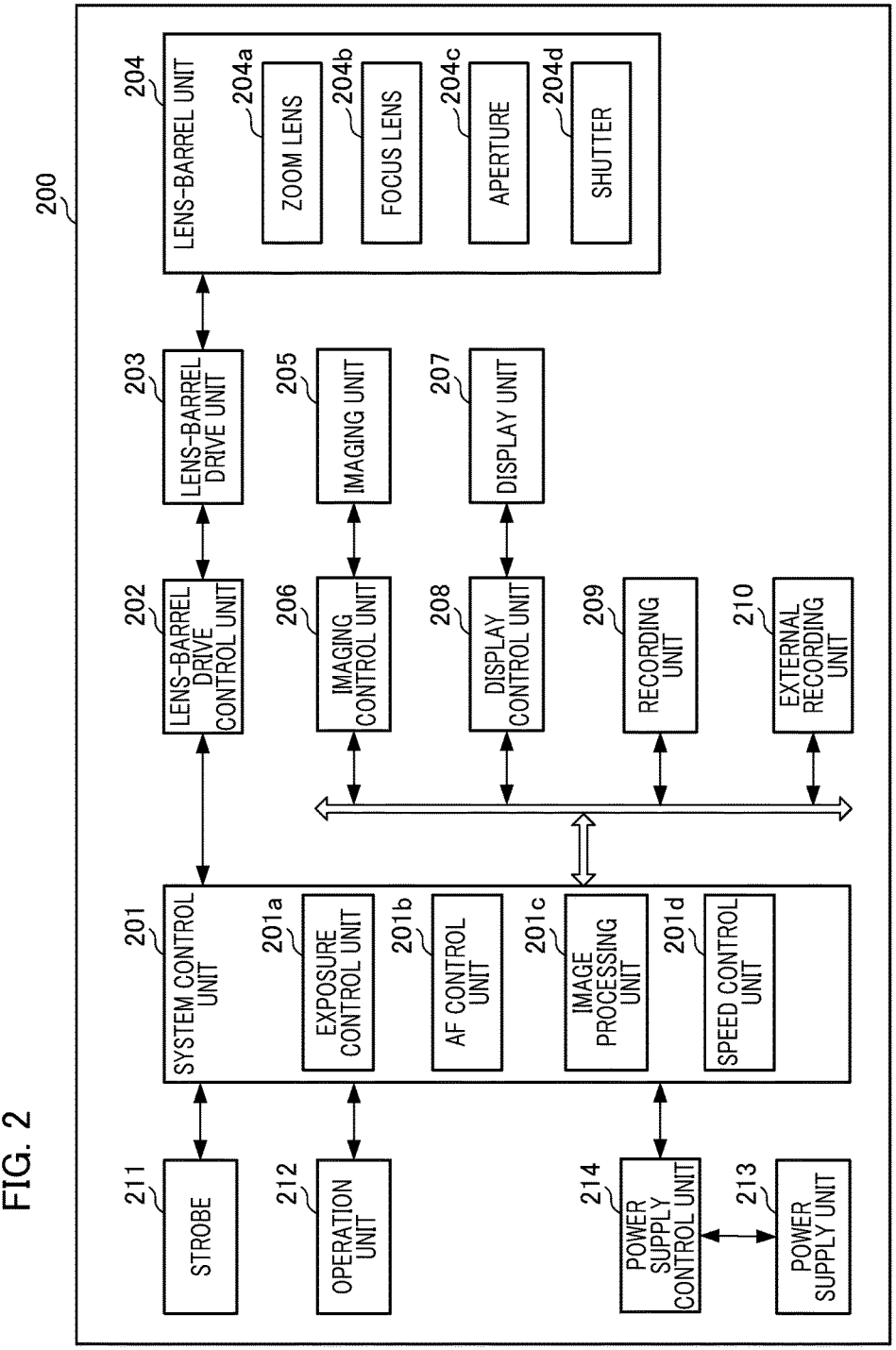
FIG. 2 is a configuration diagram of a system according to embodiments of the present invention.

FIG. 2 is a system block diagram of a lens barrel device 200. A system control unit 201 is a control center of the lens barrel device 200 and includes a central operation processing unit (CPU). The CPU reads and executes a program from a memory, and controls an entire system. Some functions of the system control unit may be constituted by a circuit such as an application specific integrated circuit (ASIC) or the like. Each control function of the system control unit 201 in an exposure control unit 201a in FIG. 2, an automatic focus detection and focus adjustment (AF) control unit 201b, an image processing unit 201c, and a speed control unit 201d is expressed by a block element. Each control unit in the system control unit 201 performs appropriate lens barrel control and imaging processing according to a situation.

The system control unit 201 controls a lens-barrel unit 204 through a lens-barrel drive control unit 202 and a lens-barrel drive unit 203. The exposure control unit 201a and the AF control unit 201b perform predetermined arithmetic processing using image data acquired by the imaging unit 205 and the imaging control unit 206, and output the arithmetic results to the lens-barrel drive control unit 202. The lens-barrel drive control unit 202 outputs a drive signal to the lens-barrel drive unit 203 on the basis of the arithmetic results. The lens-barrel unit 204 includes a zoom lens 204a, a focus lens 204b, an aperture 204c, and a shutter 204d. The lens-barrel unit 204 is driven and controlled on the basis of a drive signal from the lens-barrel drive unit 203.

The lens-barrel drive control unit 202 is mainly constituted by a driver IC and the like, and generates and outputs a drive control signal to the lens-barrel drive unit 203 based on a control signal from the system control unit 201 and detection signals of various types of sensors which perform optical detection, magnetic detection, inclination detection, or the like. In addition, the lens-barrel drive control unit 202 outputs detection signals of various types of sensors to the speed control unit 201d. The lens-barrel drive unit 203 includes each lens group constituting the lens-barrel unit 204 and various types of motors which are drive sources of lens-barrel mechanisms. The various types of motors include a direct current (DC) motor, a stepping motor, and the like. Each function of the zoom lens 204a, the focus lens 204b, the aperture 204c, and the shutter 204d is realized by control by a corresponding drive source.

The image processing unit 201c performs desired image data processing on data from an imaging control unit 206, a recording unit 209, and an external recording unit 210. Specifically, pixel interpolation, resizing processing such as image reduction, color conversion processing, or the like is executed.

The speed control unit 201d calculates a speed of the zoom lens 204a and the focus lens 204b according to an output signal of an encoder using an optical detection sensor and the like. The optical detection sensor and the encoder are installed in the lens-barrel drive unit 203 and generate operation state signals of various types of motors of the lens-barrel drive unit 203 as pulse signals. The speed control unit 201d processes a frequency of the generated pulse and detects a rotation direction and a rotation speed. Speed control is performed so that a drive speed of the zoom lens 204a and the focus lens 204b becomes a predetermined target speed. That is, the speed control unit 201d outputs a control signal in accordance with a difference between a detection speed of each lens acquired by the speed control unit 201d and a target speed to the lens-barrel drive control unit 202. It is possible to calculate a driving distance of the zoom lens 204a and the focus lens 204b on the basis of a detection signal by the encoder.

The imaging unit 205 includes an imaging element such as a charge coupled device (CCD) type image sensor or a complementary metal oxide semiconductor (CMOS) type image sensor. The imaging element photo-electrically converts an optical image light-condensed by a lens group in the lens-barrel unit 204 into an electrical signal, and outputs the electrical signal to the imaging control unit 206. The photo-electrically converted electrical signal is converted into a video signal by a signal processing circuit in the imaging control unit 206, and is subjected to predetermined processing. As a result, a signal capable of displaying a video is generated.

A display unit 207 includes a display device such as a liquid crystal display. A display control unit 208 generates image data for display and outputs the image data to the display unit 207 via a digital (D) to analog (A) conversion unit (not shown). The display unit 207 displays images on a screen according to the image data for display. For example, image data from the imaging unit 205 and the imaging control unit 206 are sequentially output to the display unit 207 through the display control unit 208. As a result, an electronic view finder (EVF) function can be realized.

The recording unit 209 includes a recording medium, records various data such as video information after shooting, time information, and setting information, and records temporary data at the time of image processing or the like. The recording unit 209 further includes a memory device for storing various types of programs executed by the system control unit 201. The external recording unit 210 includes a recording medium such as a memory card. The external recording unit 210 records information such as image data subjected to predetermined processing. The strobe 211 has a light projecting function of an AF auxiliary light and a strobe dimming function, and is controlled in a through-the-lens (TTL) method by the exposure control unit 201a and the AF control unit 201b.

The operation unit 212 receives an operation signal from a user and notifies the system control unit 201 of the operation signal. The operation unit 212 has various types of operation switches or levers of a device main body unit, a touch panel embedded in the display unit 207, and the like. For example, a user can instruct a start of operations such as AF processing, automatic exposure (AE) processing, auto white balance (AWB) processing, and strobe pre-emission (EF) processing by pressing a release button halfway and turning on a first switch (SW1) of a release switch. A user can instruct a start of an imaging operation by pressing the release button all the way and turning on a second switch (SW2) of the release switch. In addition, a user can instruct an imaging apparatus to perform a zoom operation using a zoom operation lever. While the zoom operation lever is pressed down, the system control unit 201 controls a magnification operation within a specified range, and ends the zoom operation if a release of the zoom operation lever is detected.

A power supply unit 213 is controlled by a power supply control unit 214 according to a control command of the system control unit 201. The power supply unit 213 is a primary battery, a secondary battery, an AC adapter, or the like. The power supply control unit 214 includes a power supply detection circuit, a DC-DC converter, an excessive current detection circuit, a battery remaining amount detection circuit, and the like, and supplies power from the power supply unit 213 to each constituent unit of a system at a predetermined voltage when necessary.

(First Embodiment)

Figure 1:
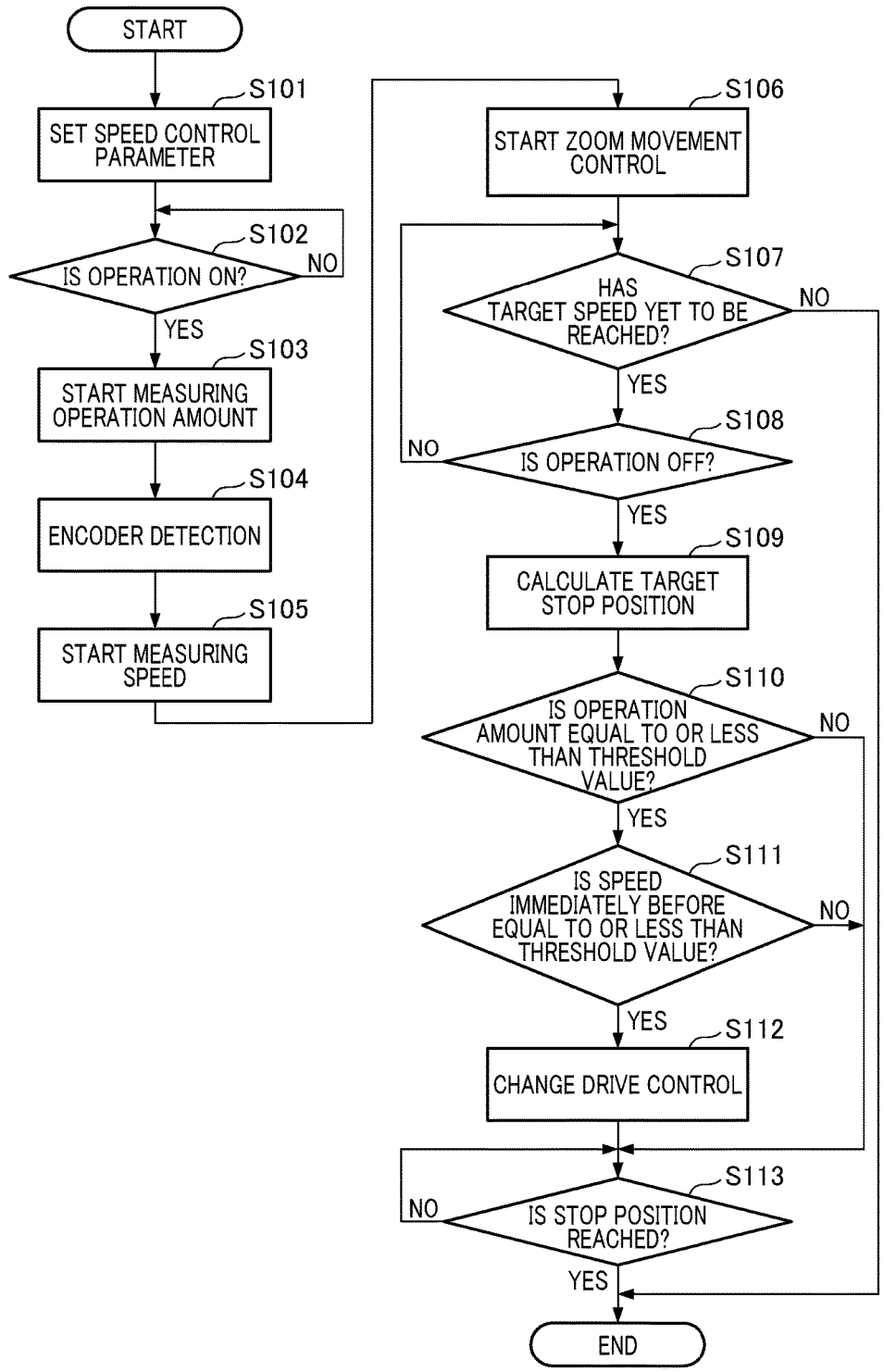
FIG. 1 is a flowchart illustrating processing of a first embodiment of the present invention.
Figure 3:
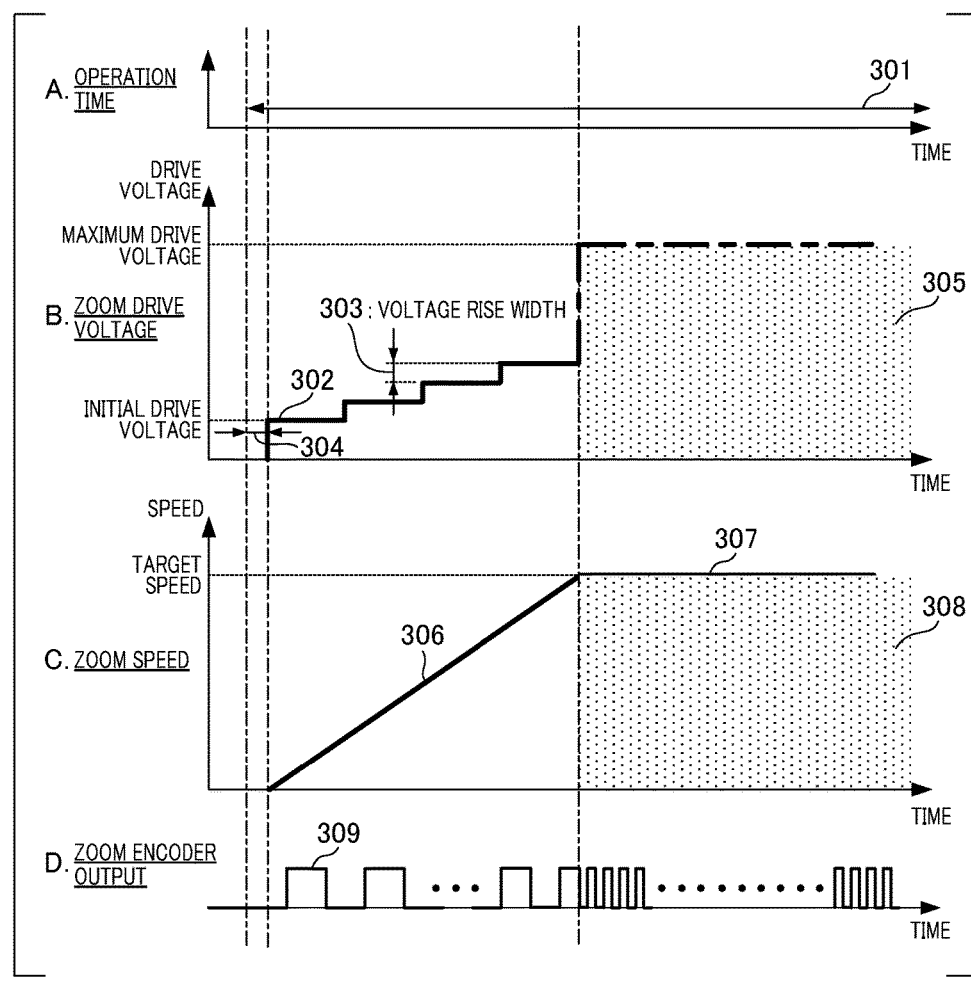
FIG. 3 is a diagram illustrating zoom movement control of a comparative example.
Figure 4:
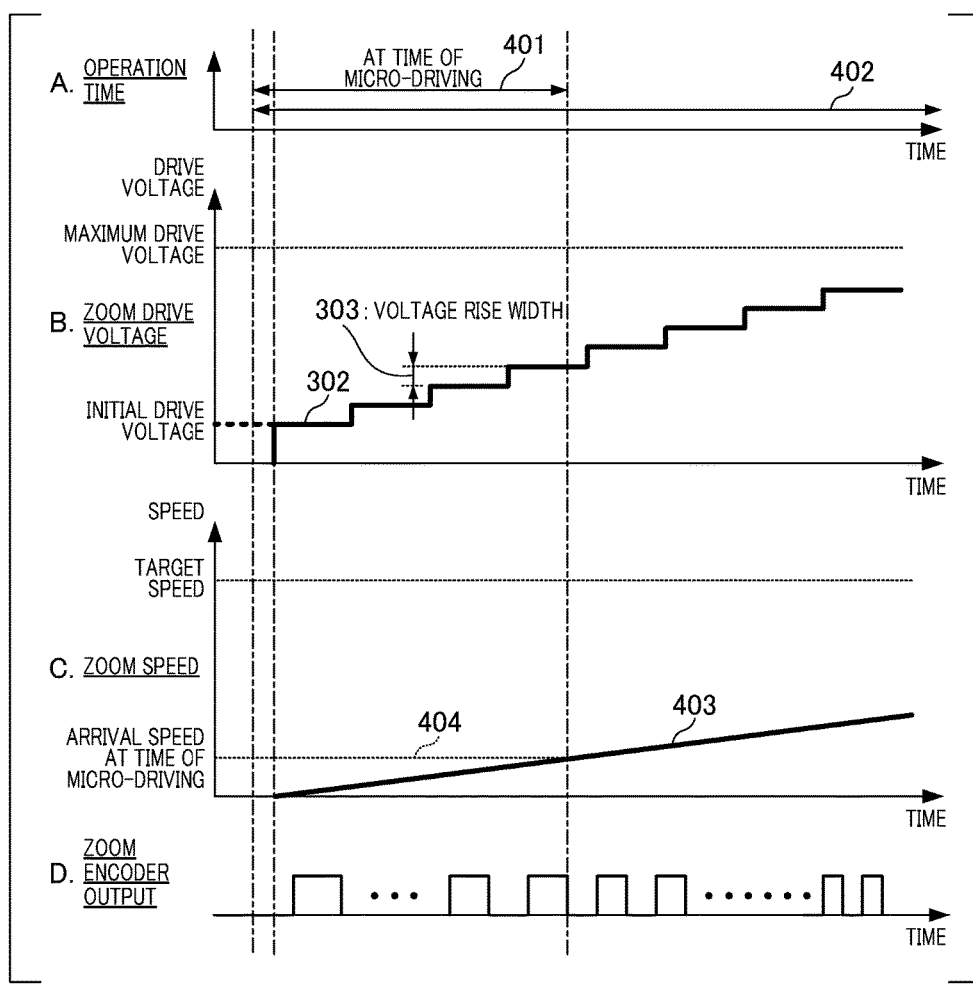
FIG. 4 is a diagram illustrating movement at the zoom micro-driving.
Figure 5:
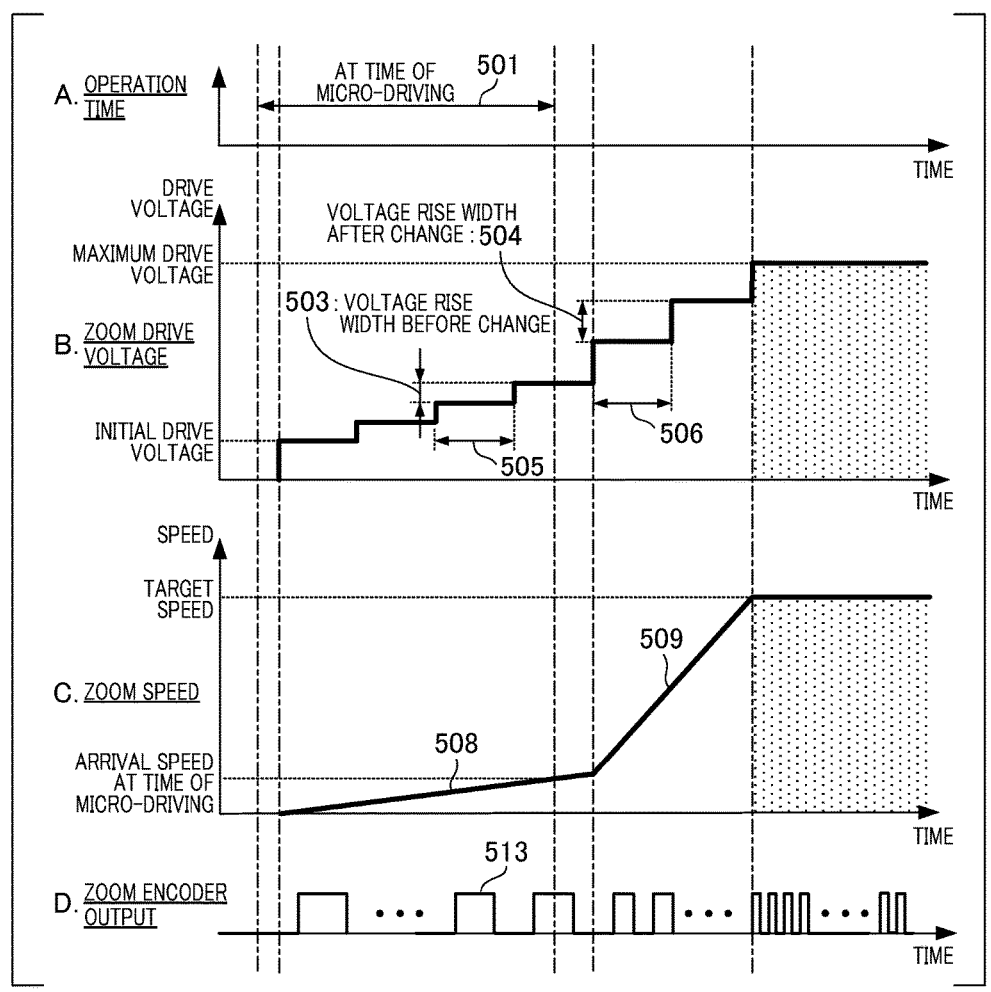
FIG. 5 is a diagram illustrating zoom drive start control of the first embodiment.

A first embodiment of the present invention will be described in detail with reference to FIGS. 1 to 5. FIG. 1 is a flowchart illustrating zoom movement control at the zoom micro-driving in the present embodiment. FIG. 3 is a diagram illustrating a zoom movement control of a comparative example. FIG. 4 is a diagram illustrating movement at the zoom micro-driving. FIG. 5 is a diagram illustrating zoom movement control in which an operation state of a user is reflected.

Before the present embodiment is described, zoom movement control of a comparative example will be described. In FIG. 3, a horizontal axis is set as a common time axis, a graph A illustrates an operation time, a graph B illustrates a zoom drive voltage, a graph C illustrates a zoom speed, and a graph D illustrates an output of a zoom encoder. The graph A represents an operation time of a user operation. An operation time 301 is an operation time from an operation start time point when a user performs an operation using an operation member included in the operation unit 212. The system control unit 201 controls a zoom operation according to an operation instruction of a user.

The graph B illustrates a zoom drive voltage controlled by the system control unit 201. An initial drive voltage 302 is an initial drive voltage supplied to a zoom motor at the time of drive start. The zoom drive voltage rises in the phased manner as shown in a voltage rise width 303. The voltage rise width 303 is a rise width that changes from the initial drive voltage 302 every fixed period, and may be arbitrarily determined. A time difference 304 is a time difference from a start time at which a user operation is detected to a time at which a drive voltage is actually supplied to a zoom motor. A region 305 is a speed control region. In speed control, if a predetermined condition is satisfied, a procedure shifts to the speed control region 305. The predetermined condition is, for example, any one or more of following (I) to (III).

(I) a zoom speed reaches the target speed (II) a gradual voltage rise period passes over a certain period of time (III) a zoom drive voltage reaches a maximum drive voltage due to a voltage rise The graph B illustrates a case in which the zoom speed has reached the target speed.

The graph C represents a zoom speed (drive speed of zoom motor) controlled by a drive voltage. A zoom speed 306 changes (rises) in accordance with the initial drive voltage 302 and the gradual voltage rise width 303 from the initial drive voltage. Then, the zoom speed 306 reaches a target speed 307. A speed control region 308 corresponds to the speed control region 305 of the graph B. The graph D represents an output of a zoom encoder which is detected at the zoom operation. In an output signal of the zoom encoder, one pulse 309 corresponds to one count portion of the zoom encoder which is detected. The speed control unit 201d acquires the output signal of the zoom encoder and calculates a current zoom speed. During the speed control, feedback control is performed so that a difference between the target speed and the calculated current zoom speed becomes zero.

Zoom movement control is performed as follows if a zoom operation is started from a stop state of the zoom lens 204a. First, as shown in the graph A, a user instructs the imaging apparatus to start the zoom operation using the operation unit 212. The system control unit 201 receives an operation instruction of a user, and starts zoom movement control. The lens-barrel drive control unit 202 that has started control outputs a predetermined initial drive voltage 302 to the lens-barrel drive unit 203. Next, the lens-barrel drive control unit 202 adds a voltage value of the voltage rise width 303 set in advance at every fixed period to the initial drive voltage 302, and outputs a voltage of the addition to the lens-barrel drive unit 203. A voltage applied to the lens-barrel drive unit 203 increases every fixed period. The processing is repeatedly performed until one of the conditions (I) to (III) is satisfied. If a predetermined condition is satisfied, the zoom movement control ends and the lens-barrel drive control unit 202 shifts to control in the speed control region (305, 308).

Next, movement control at the zoom micro-driving will be described with reference to FIG. 4. FIG. 4 represents a state in which a lens-barrel load is large with respect to FIG. 3. Since the graphs in FIG. 4 correspond to the graphs in FIG. 3, respectively, description of items which are common to both FIG. 3 and FIG. 4 will be omitted and only differences will be described. A first period 401 and a second period 402 shown in a graph A indicate operation periods of a user. The first period 401 corresponds to an operation time at the zoom micro-driving. In the present specification, the zoom micro-driving (hereinafter, simply referred to as "micro-driving") is set as driving completed before the drive speed of the zoom lens 204a reaches the target speed, in other words, before a shift to the speed control.

A speed change 403 of a graph C in FIG. 4 indicates a time-based zoom speed change in the first period 401 and the second period 402. That is, the speed change 403 is a change in a zoom movement speed when a zoom operation is performed according to the initial drive voltage 302 and the voltage rise width 303. As compared with the zoom speed 306 shown in the graph C in FIG. 3, a voltage supplied to the lens-barrel drive unit 203 is not changed, but loads on the zoom lens 204a increase in FIG. 4, and thus a change amount in the zoom movement speed decreases. That is, as compared with the graph C in FIG. 3, an inclination value of a graph showing a zoom speed in the graph C in FIG. 4 is small. An arrival speed 404 at the micro-driving is an arrival speed at a time at which the zoom operation ends.

If a user's operation is performed over the second period, that is, if sufficient operation time continues for the zoom speed to reach the target speed, the zoom speed in the graph C in FIG. 4 takes longer than in the case of the graph C in FIG. 3, but eventually reaches the target speed. However, if a user's operation is performed in a short period of time shown in the first period 401, the zoom speed of the graph C in FIG. 4 reaches the arrival speed 404 at a time at which the operation ends, and the driving ends before a sufficient speed is reached. In this case, there is concern that the zoom lens 204a will hardly start to move, the zoom lens 204a will not be extended to a position intended by a user, there will be variation in movement with respect to a user's operation instruction by the operation unit 212, or the like. Furthermore, if the micro-driving operation ends in a short period of time and the driving continues up to a target position before a sufficient zoom speed is obtained, time taken from an operation start time to a driving end time may significantly increase. A decline of response in this case causes a sense of discomfort in a user's operations.

With respect to problems occurring at the micro-driving, there is a method of increasing a drive current of the lens-barrel drive unit 203 at the time of zoom movement and improving the response of the zoom lens 204a. However, in this method, a large inrush current may occur at the time of zoom movement, and there is concern about effects of a voltage drop on a power supply or effects on operations of other actuators and ICs.

In the present embodiment, it is possible to realize the following zoom drive control.

Performing control so that a user hardly feels a response drop at zoom start-up.

Performing normal zoom movement control on a zoom operation requiring a predetermined operation time or more (FIG. 3 and FIG. 4).

Coping in accordance with an increase in drive current at the zoom micro-driving requiring response.

Therefore, control is performed in consideration of an inrush current at the time of start-up, and a zoom operation amount is detected and reflected in zoom operation control at the time of movement in the present embodiment. That is, drive voltage control of zoom movement is performed in accordance with a detected zoom operation amount and a drive speed at a time at which a zoom operation ends. Zoom movement control in the present embodiment will be described with reference to FIG. 5. The graphs in FIG. 5 correspond to the graphs in FIG. 4, respectively, and thus only differences between FIG. 4 and FIG. 5 will be described.

A period 501 of a graph A in FIG. 5 corresponds to an operation time at the zoom micro-driving. A voltage rise width 503 of a graph B in FIG. 5 is a voltage rise width in the period 501. A voltage rise width 504 is a voltage rise width changed after the period 501 elapses. Time widths 505 and 506 are step widths which maintain the same voltage.

The time width 505 is a time width before micro-driving is detected. The time width 506 is a time width after the micro-driving is detected.

A speed change 508 of a graph C in FIG. 5 is a change in zoom speed before the micro-driving is detected. A speed change 509 is a change in zoom speed after the micro-driving is detected. A pulse 513 of a graph D in FIG. 5 represents an output of the zoom encoder detected immediately before the micro-driving is detected.

At the time of zoom movement, while a user operates the operation unit 212, the zoom movement control continues until the zoom speed reaches the initially set target speed. If the micro-driving is not detected during the zoom movement control before the zoom speed reaches the target speed, the zoom movement control is performed as described in FIGS. 3 and 4.

On the other hand, if the micro-driving is detected during the zoom movement control, in other words, if an operation of an operation member by a user ends during the zoom movement control, the lens-barrel drive control unit 202 detects a zoom speed immediately before the micro-driving is detected using the pulse 513 of the zoom encoder. The detected zoom speed is compared with the target speed, and it is determined whether a difference between the zoom speed and the target speed is equal to or greater than a threshold value set in advance in the system control unit 201. If the difference is equal to or greater than the threshold value, the system control unit 201 determines that it is difficult for a current voltage rise width 503 to reach a target stop position within a fixed period or that there is a problem in movement itself of the zoom lens 204*a*. In this case, the system control unit 201 increases a voltage rise width every fixed period from the voltage rise width 503 to the voltage rise width 504 with respect to the voltage supplied to the lens-barrel drive unit 203. An increase width of the voltage rise can be arbitrarily determined. By increasing the voltage rise width 504 after the zoom micro-driving is detected as compared to the voltage rise width 503 before the detection, the speed change 509 after the micro-driving detection is larger than the speed change 508 before the micro-driving detection and the startability is improved.

The system control unit 201 does not end the operation of the lens-barrel drive unit 203 immediately after a user ends the operation of the operation unit 212, but ends the operation of the lens-barrel drive unit even after the driving is continued for a short period of time. If a desired arrival distance is not obtained in a short period of time from a time at which a user's operation ends to a time at which the zoom driving ends, the zoom operation may also be performed continuously until a position of the zoom lens 204*a* reaches a position corresponding to the arrival distance.

In the present embodiment, switching of a rise width of the drive voltage is determined by detecting a zoom speed immediately before the micro-driving is detected, but there are multiple switching determination methods. For example, the system control unit 201 calculates the desired arrival distance by detecting a current position of the zoom lens 204*a* and an operation time of the operation unit 212 by a user immediately before the micro-driving is detected. Switching of a voltage rise width is determined on the basis of a result of comparison between the calculated arrival distance and the current position. That is, the system control unit 201 compares the calculated arrival distance with the current position and determines whether it is possible to reach the target stop position within a fixed period at the current voltage rise width. If it is determined that it is not possible to reach the target stop position within the fixed period at the current voltage rise width, switching processing of a voltage rise width is performed and a voltage rise width is set to a relatively large value.

In the present embodiment, a changed voltage rise width 504 is set to a predetermined fixed rise width (increase width), but it may be set to a variable increase width by adjusting a rise width according to a situation. For example, the system control unit 201 compares the calculated arrival distance with the current position, and calculates a voltage rise width required to compensate for an insufficient distance within a fixed period. That is, as the insufficient distance increases, the rise width (increase width) is set to a larger value. In setting of a rise width of the drive voltage, a current situation of the lens-barrel unit 204, for example, a posture with respect to the gravity direction of the lens-barrel unit 204 related to an operation load, a lens-barrel CAM inclination of a current position, and a lens-barrel temperature, is referred to. By adding a voltage rise width in accordance with a load on the lens-barrel unit 204, the zoom drive control can be performed by appropriately changing the voltage rise width. In addition, the system control unit 201 determines a state of the power supply unit 213, and performs a setting which suppresses a voltage rise width to be equal to or less than a predetermined value, for example, if a battery remaining amount is equal to or less than a predetermined threshold value.

Next, with reference to FIG. 6, a method of increasing a voltage will be described with the following two examples.

Figure 6:
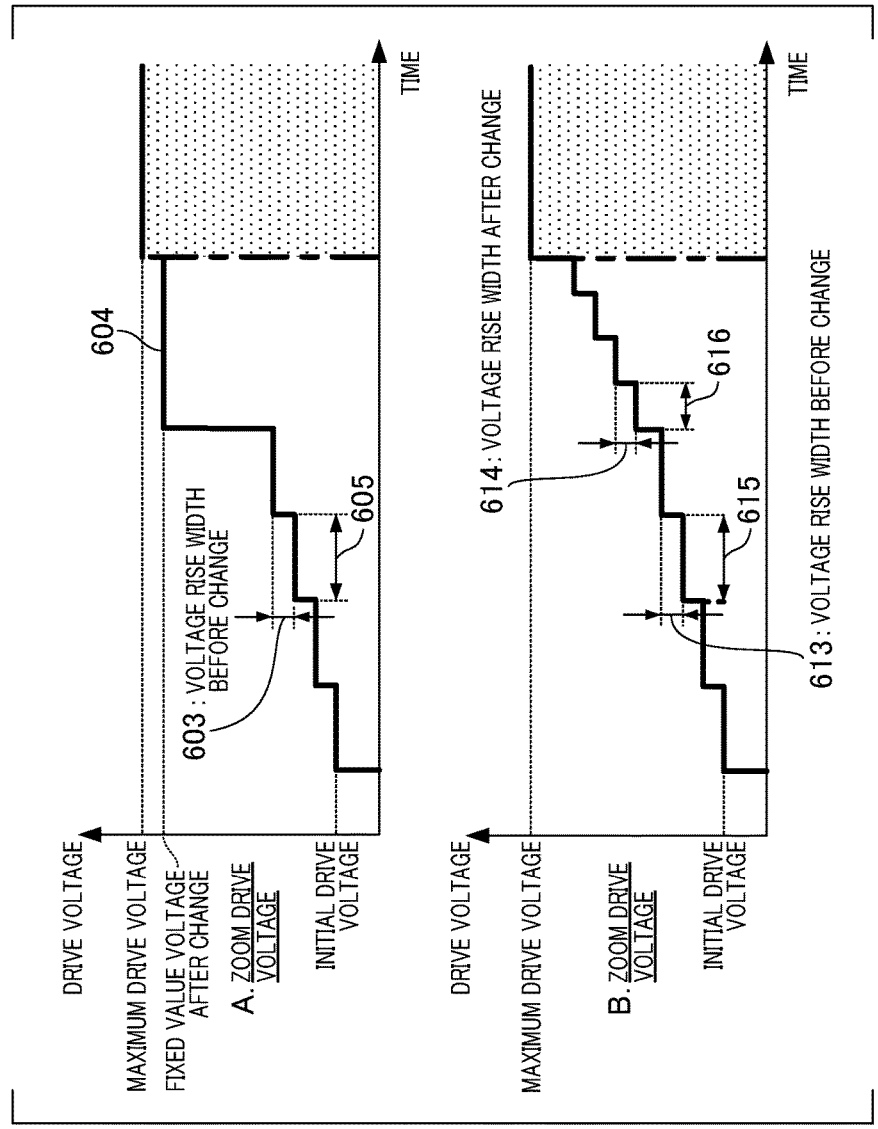
FIG. 6 is a diagram illustrating control of a drive voltage after zoom micro-driving in the first embodiment is detected.

A first method of setting an arbitrary fixed value voltage after a gradual voltage rise (graph A in FIG. 6)

A second method of increasing a voltage rise value (rise rate) every fixed period by shortening a step width (time width) of the drive voltage (graph B in FIG. 6)

In the graphs of FIG. 6, description of items common to the graphs in FIG. 3, FIG. 4, and FIG. 5 will be omitted.

The first method will be described with reference to the graph A in FIG. 6. A fixed value voltage 604 is a fixed voltage arbitrarily set after the zoom micro-driving is detected. After the zoom micro-driving is detected, the lens-barrel drive control unit 202 sets the drive voltage to the lens-barrel drive unit 203, which has been increased in the phased manner, to the fixed value voltage 604. For example, it is assumed that an arrival speed during the micro-driving is significantly lower than a threshold value for the target speed. In this case, it is determined that even steep speed increase is necessary, and the lens-barrel drive control unit 202 responds by setting a relatively high voltage as a fixed value and applying it to the lens-barrel drive unit 203. If a detected current zoom speed reaches the target speed after the fixed value voltage 604 is set, the zoom movement control is shifted to the speed control as described in the graphs A to D in FIG. 5.

The second method will be described with reference to the graph B in FIG. 6. A voltage rise width 613 is a voltage rise width before the zoom micro-driving is detected. A voltage rise width 614 is a voltage rise width changed after the zoom micro-driving is detected. The voltage rise widths 613 and 614 have the same voltage rise width. Time widths 615 and 616 are time widths (step widths) in which the same voltage is maintained. The time width 615 is a time width before the micro-driving is detected, and the time width 616 is a time width after the micro-driving is detected. In the second method, processing for increasing a voltage rise value within a fixed period is performed by shortening a time width. After the micro-driving is detected, the lens-barrel drive control unit 202 sets the time width 616 to be shorter than the time width 615 before the micro-driving is detected. When a time width in which the same voltage is maintained is shortened, a voltage rise width (rise rate) increases every fixed period without a change in a rise width of the drive voltage, which has increased in the phased manner. It is easy to use both the drive voltage control of the graphs A to D in FIG. 5 and the drive voltage control of the graph B in FIG. 6. In this case, the voltage rise control can be performed in a steeper and more specific manner.

In addition to this, various methods of changing a voltage rise width after the micro-driving is detected can be used. Moreover, in addition to using the control of the graphs A to D in FIG. 5 and the control of the graph B in FIG. 6 together, it is possible to combine a plurality of voltage rise methods according to a situation. For example, in the case of control of the graph A in FIG. 6, there is a concern that an inrush current due to a voltage variation may increase. Therefore, the lens-barrel drive control unit 202 compares an arrival speed and the target speed at the the micro-driving, and performs a switch to a method of gradually increasing a voltage on the basis of a result of the comparison. By selectively using a plurality of types of voltage rise control, it is possible to improve the response of zoom movement while conserving power.

An example of zoom micro-driving control in the present embodiment will be described with reference to the flowchart of FIG. 1. The following processing is realized by a CPU reading and executing a program from a memory. First, the system control unit 201 sets a speed control parameter necessary for the zoom operation (S101). Next, the system control unit 201 determines whether a user has performed an operation of the zoom operation member included in the operation unit 212 (S102). If it is determined that a user has performed the zoom operation in S102, the procedure proceeds to the processing of S103, and if it is determined that the zoom operation has not been performed, the procedure repeats the processing of S102 and is in a standby state until the zoom operation is started.

In S103, the system control unit 201 starts measuring time from a time at which an operation by a user is started to a time at which the operation ends. The measured time corresponds to an operation amount. Next, the lens-barrel drive control unit 202 starts zoom encoder detection for detecting an operation of the zoom lens 204a (S104). The lens-barrel drive control unit 202 starts zoom speed measurement from a detected zoom encoder signal (S105). Next, the system control unit 201 starts zoom movement control (S106). The system control unit 201 transmits a control signal for transmitting an initial drive voltage to the lens-barrel drive unit 203 to the lens-barrel drive control unit 202. The lens-barrel drive unit 203 supplies the initial drive voltage to a drive source (motor) of the zoom lens 204a. After the initial drive voltage is supplied, the lens-barrel drive unit 203 which has received a drive signal from the lens-barrel drive control unit 202 gradually increases the drive voltage at regular intervals from an initial voltage until the zoom speed reaches the target speed.

In S107, the system control unit 201 determines whether the zoom speed reaches the target speed. If the zoom speed reaches the target speed, the system control unit 201 ends zoom movement control. In addition, if the zoom speed does not reach the target speed, the procedure proceeds to processing of S108. The system control unit 201 determines whether a user ends a zoom operation using the operation unit 212 (S108). If it is determined that a user ends the zoom operation, the procedure proceeds to processing of S109, and if it is determined that a user continues the zoom operation, the procedure returns to the processing of S107.

In S109, the system control unit 201 calculates the target stop position. The system control unit 201 calculates a current position of the zoom lens 204a using a detected zoom encoder signal, and sets a proximate position at which it is determined that the zoom lens 204a can stop in advance as the target stop position on the basis of a detected operation amount. Here, the target stop position is set based on the operation amount to reflect a movement amount corresponding to a position which is originally scheduled to be reached to the target stop position from the operation amount of a user if a current position of the zoom lens 204a is almost the same as a drive start position.

The system control unit 201 calculates the target stop position of the zoom lens 204a and compares the operation amount of the zoom operation member with a pre-set threshold value (S110). The operation amount is an amount of operation of the zoom operation member by a user from an operation start time. If it is determined that the operation amount is equal to or less than the threshold value in S110, that is, if the movement amount of the zoom lens 204a is an amount corresponding to the zoom micro-driving, the procedure proceeds to processing of S111. In addition, if it is determined that the operation amount exceeds the threshold value in S110, the procedure shifts to processing of S113.

In S111, the system control unit 201 compares a zoom speed value immediately before a time at which a user ends the zoom operation with a predetermined threshold value, and determines whether the speed value is equal to or less than the threshold value. If it is determined that the zoom speed value immediately before the operation ends is equal to or less than the threshold value, the system control unit 201 determines that the zoom speed is not a sufficient drive speed, and the procedure proceeds to processing of S112. In addition, if it is determined that the zoom speed value immediately before the operation ends is greater than the threshold value, the procedure shifts to processing of S113.

In S112, the system control unit 201 changes control content of the lens-barrel drive unit 203 by the lens-barrel drive control unit 202 and control to relatively increase a rise rate of the drive voltage is performed. Specifically, for example, control to raise a voltage rise width which has been increased at regular time intervals is performed before a determination of the micro-driving. Details of the voltage rise control have been described with reference to the graphs in FIG. 5 and FIG. 6. After the drive control is changed, the system control unit 201 determines whether the target stop position is reached in S113. If it is determined that the zoom lens 204a reaches the target stop position, the system control unit 201 ends the zoom movement control. In addition, if it is determined that the zoom lens 204a does not reach the target stop position, the lens-barrel drive control unit 202 continues to output a drive signal until the zoom lens 204a reaches the target stop position.

After the zoom movement control described above ends, the zoom movement control is immediately shifted to the speed control without hesitation. Since the speed control is not directly related to the gist of the present invention, description thereof will be omitted. In the present embodiment, in S111 of FIG. 1, determination processing is performed using the zoom speed value immediately before the operation ends, but determination may be performed using the movement amount of the zoom lens 204a from a time at which driving starts to a time immediately before a zoom operation ends. In this case, if the movement amount is compared with a predetermined threshold value in S111 and it is determined that the movement amount is equal to or less than the threshold value, the procedure shifts to S112 and control to relatively increase a rise rate of the drive voltage is performed. Furthermore, the system control unit 201 acquires a zoom encoder signal before and after the time at which the zoom operation ends and calculates an amount of changes in zoom speed, and then using the amount of changes as an index of determination reference in S111. If the amount of change in zoom speed is equal to or less than a predetermined threshold value and acceleration is not sufficient, the procedure shifts to S112 and control to relatively increase the rise rate of the drive voltage is performed.

A In the present embodiment, an operation amount when the zoom operation is performed is detected and it is determined whether there is zoom micro-driving. If it is determined that there is zoom micro-driving and a motor driving amount is equal to or less than a predetermined threshold value, response at the zoom micro-driving is improved by relatively increasing a voltage rise rate with respect to a supply of the drive voltage which has been gradually performed. According to the present embodiment, it is possible to improve startability at the zoom micro-driving while minimizing an inrush current when a zoom operation starts.

(Second Embodiment)

A second embodiment will be described with reference to FIGS. 2 to 7. In the present embodiment, description of the same constituent elements and technical content as in the first embodiment will be omitted, and differences will be mainly described.

Figure 7:
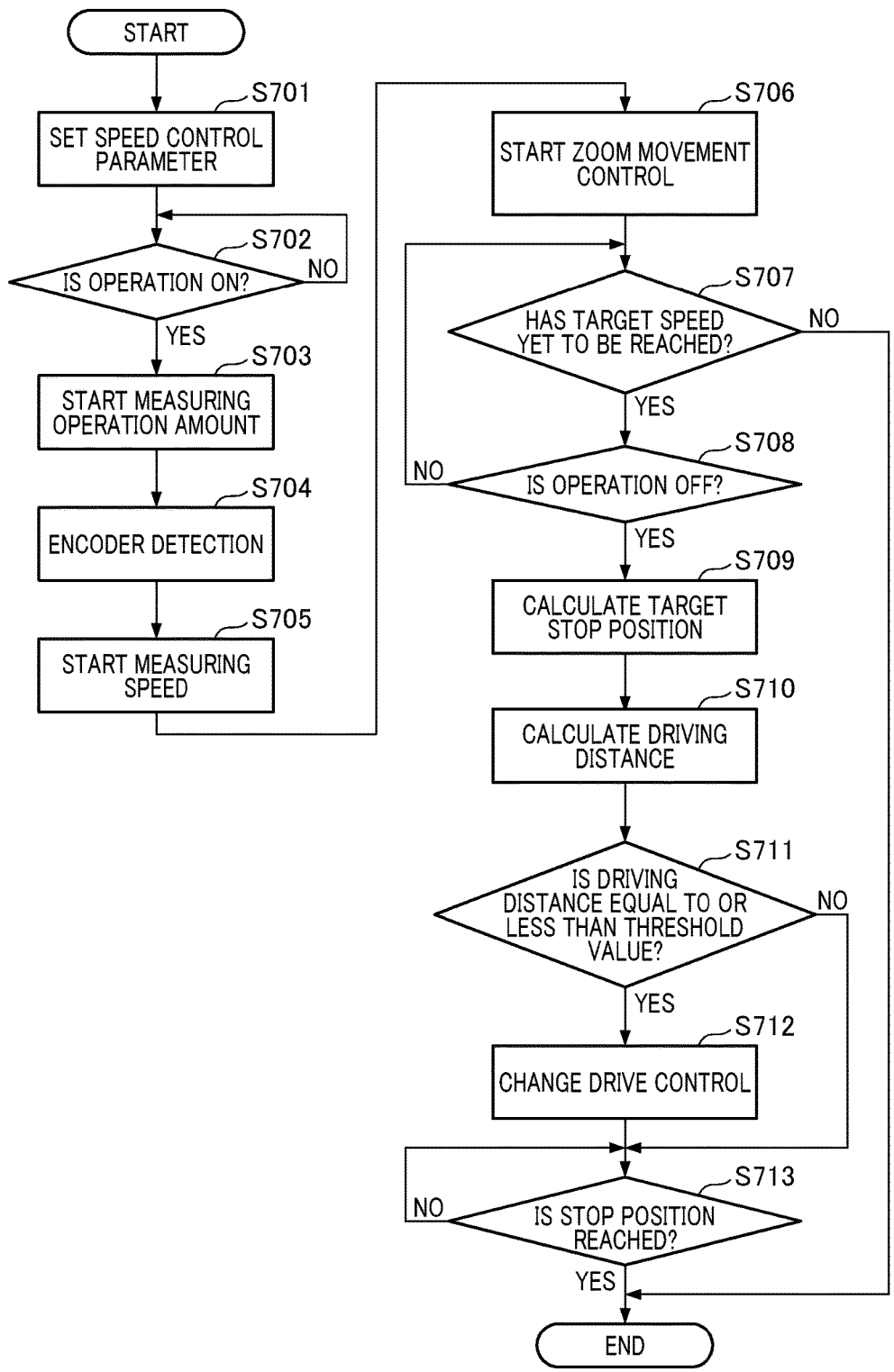
FIG. 7 is a flowchart illustrating processing of second embodiment of the present invention.

FIG. 7 is a flowchart illustrating an operation of the present embodiment. In the present embodiment, the detection of zoom micro-driving is determined by a driving distance of the zoom lens 204*a* from a time at which a user starts an operation of the operation unit 212 to a time at which the operation ends. The processing shown in FIG. 7 is executed in the operation sequence or the operation mechanism shown in FIGS. 2 to 6. The processing of S701 to S709 is the same as the processing of S101 to S109 in FIG. 1, and thus description thereof will be omitted.

The procedure proceeds to S710 from S709, and the system control unit 201 calculates the driving distance of the zoom lens 204*a*. The driving distance is a distance the zoom lens 204*a* is driven by the lens-barrel drive unit 203 between a time at which a user starts a zoom operation using the operation unit 212 to a time at which the zoom operation ends. Next, the system control unit 201 determines whether the calculated driving distance is equal to or less than a predetermined threshold value (S711). If it is determined that the driving distance calculated in S710 is equal to or less than the threshold value, the system control unit 201 determines that the zoom lens 204*a* has not moved to the position which is originally scheduled to be reached, and the procedure proceeds to processing of S712. In addition, if it is determined that the driving distance calculated in S710 is greater than the threshold value, the procedure shifts to processing of S713.

In S712, the system control unit 201 changes the control content of the lens-barrel drive unit 203 by the lens-barrel drive control unit 202, and control to relatively increase the rise rate of the drive voltage is performed. Since a change in the control content is the same as in A first embodiment, description thereof will be omitted. The next step of S713 is processing for determining whether the zoom lens 204*a* has reached the target stop position. If it is determined that the zoom lens 204*a* has reached the target stop position, the processing ends. If it is determined that the zoom lens 204*a* has not reached the target stop position, the processing of S713 for determining whether the zoom lens 204*a* has reached the target stop position is repeated.

In the present embodiment, determination based on a driving distance threshold value is performed in S711, but, for example, an amount of changes in a view angle between the time at which a user starts the zoom operation and the time at which the operation ends may also be compared with a predetermined value. If the amount of changes in a view angle is equal to or less than the threshold value, it is determined that there is zoom micro-driving and control to relatively increase a rise rate of the drive voltage is performed. If the zoom lens 204*a* does not move to the position which is originally scheduled to be reached, the zoom operation ends without an operation of changing a desired view angle being performed, and thus it is determined that there is micro-driving. Furthermore, the determination of micro-driving may also be performed by using both the driving distance of the zoom lens 204*a* and the amount of changes in a view angle. In this case, the determination of micro-driving is performed based on both an actual driving motion amount of the lens 204*a* and an amount of changes in a view angle which can be visually recognized by a user, and thus it is possible to make a more accurate determination.

According to the present embodiment, it is possible to improve startability at the zoom micro-driving while minimizing an inrush current when a zoom operation starts. Therefore, response in a zoom micro-driving for zoom movement or view angle adjustment is improved.

The present invention is not limited to the embodiments, and is applicable to a lens device such as an exchangeable lens that can be attached to an imaging apparatus main body. For example, the lens device includes a zoom operation member disposed on the side grip. A user can adjust a view angle according to movement of a zoom lens by operating the zoom operation member while the lens device is attached to the imaging apparatus main body. In this case, the lens-barrel drive unit 203 is disposed in the lens-barrel unit 204, and drive control of the zoom lens is performed according to a so-called electrically-powered zoom function. The lens-barrel drive control unit in the lens device or in the imaging apparatus main body controls the drive voltage on the basis of an operation amount of the zoom operation member and a detection signal of the zoom speed. If zoom micro-driving is detected, the control to change the drive voltage in the phased manner between the time at which the operation of the zoom operation member starts and the time at which the operation ends is changed into the change to relatively increase a rise rate of the drive voltage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-178538, filed Sep. 13, 2016 which is hereby incorporated by reference wherein in its entirety.

What is claimed is:

1. A lens drive control device which drives a lens using a drive unit according to an operation of an operation member, the lens drive control device comprising: (a) at least one processor or (b) circuitry, which functions as units comprising: (1) a detection unit configured to detect a drive speed of the drive unit; and (2) a control unit configured to control a drive voltage to the drive unit by acquiring a detection signal of the operation amount of the operation member and a detection signal of the drive speed, wherein the control unit performs first control that a drive voltage output to the drive unit between a time at which the operation of the operation member starts and the time at which the operation ends is changed in a phased manner, and second control that a rise rate of the drive voltage is relatively increased as compared to the first control, the second control being after the first control.

2. The lens drive control device according to claim 1, wherein the control unit changes the first control to the second control if the operation amount from the time at which the operation of the operation member starts to the time at which the operation ends is equal to or less than a threshold value and the drive speed is equal to or less than a threshold value at the time at which the operation ends.

3. The lens drive control device according to claim 1, wherein the detection unit detects a movement amount of the lens on the basis of the drive speed, and
wherein the control unit changes the first control to the second control if the operation amount from the time at which the operation of the operation member starts to the time at which the operation ends is equal to or less than the threshold value and the movement amount of the lens from a time at which driving of the drive unit starts to a time at which the operation ends is equal to or less than a threshold value.

4. The lens drive control device according to claim 1, wherein the control unit changes the first control to the second control if the operation amount from the time at which the operation of the operation member starts to the time at which the operation ends is equal to or less than the threshold value and a change amount of the drive speed before and after the time at which the operation ends is equal to or less than a threshold value.

5. The lens drive control device according to claim 1, wherein the control unit calculates a driving distance of the drive unit from the time at which the operation of the operation member starts to the time at which the operation ends, and changes the first control to the second control if the driving distance is equal to or less than a threshold value.

6. The lens drive control device according to claim 1, wherein the control unit calculates a change amount of a view angle from the time at which the operation of the operation member starts to the time at which the operation ends, and changes the first control to the second control if the change amount of the view angle is equal to or less than a threshold value.

7. The lens drive control device according to claim 1, wherein the control unit performs control of outputting an initial drive voltage with respect to the drive unit, and then performs control of causing the drive voltage to rise in the phased manner by every fixed period from the initial drive voltage.

8. The lens drive control device according to claim 7, wherein the control unit sets a voltage rise width for each fixed period in the second control to be larger than in the first control.

9. The lens drive control device according to claim 7, wherein the control unit changes the drive voltage to a fixed-value voltage predetermined in the second control.

10. The lens drive control device according to claim 1, wherein the control unit sets, with respect to a gradual voltage rise width for each fixed period, a length of a corresponding fixed period to be shorter in the second control than in the first control.

11. The lens drive control device according to claim 1, wherein the control unit calculates a target stop position of the lens based on the operation amount of the operation member, controls the drive unit, and performs control of moving the lens to the target stop position from a position of the lens at the time at which the operation of the operation member ends.

12. An imaging apparatus comprising:
the lens drive control device according to claim 1; and
an imaging element which photo-electrically converts light from the lens and outputs an imaging signal.

13. A lens device comprising:
the lens drive control device according to claim 1; and
the lens.

14. An imaging system comprising:
the lens control device according to claim 1;
the lens; and
an imaging element which photo-electrically converts light from the lens and outputs an imaging signal.

15. A control method executed by a lens control device which drives a lens using a drive unit according to an operation of an operation member, the method comprising:
detecting, by a detection unit, a drive speed of the drive unit; and
acquiring, by a control unit, a detection signal of an operation amount of the operation member and a detection signal of the drive speed and controlling a drive voltage to the drive unit,
wherein the controlling includes performing first control of gradually changing a drive voltage output to the drive unit between a time at which the operation of the operation member start and the time at which the operation ends and second control of relatively increasing a rise rate of the drive voltage as compared to the first control, the second control being after the first control.

* * * * *